United States Patent [19]
Taylor

[11] Patent Number: 5,836,337
[45] Date of Patent: Nov. 17, 1998

[54] LARGE DIAMETER LOW PRESSURE RELIEF VALVE

[76] Inventor: Julian S. Taylor, 8300 SW. 8th St., Oklahoma City, Okla. 73128

[21] Appl. No.: 971,910

[22] Filed: Nov. 17, 1997

[51] Int. Cl.[6] .................................................. F16K 17/14
[52] U.S. Cl. ........................................ 137/70; 137/624.27
[58] Field of Search .................................. 137/68.11, 70, 137/624.27

[56] References Cited

U.S. PATENT DOCUMENTS 5,012,834  5/1991  Taylor ........................................ 137/70
5,146,942  9/1992  Taylor ........................................ 137/67
5,577,524  11/1996 Taylor ..................................... 137/70 X Primary Examiner—John Fox
Attorney, Agent, or Firm—Robert K. Rhea

[57] ABSTRACT

A large diameter low pressure collapsible pin relief valve adapted to be connected with a vessel containing fluid under low working pressure is formed by a normally closed valve initially released to open by excess fluid pressure in the vessel applied through telescoping valve stems to a diaphragm opposite the valve for releasing a latch in the telescoping stems and collapsing the pin. Springs connected with the valve move it to full open position.

4 Claims, 4 Drawing Sheets

LARGE DIAMETER LOW PRESSURE RELIEF VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a fluid pressure relief valve and more particularly to a low working pressure relief valve.

1. Field of the Invention

Some fluid systems operate under a relatively low working pressure such as 0.45 to 0.91 kgscm (1 or 2 psi). Such a low fluid pressure system requires a valve which is sensitive to such low pressures and will effectively operate and control such pressures at a set point plus or minus 0.23 kgscm (0.5 psi). This invention provides such a relief valve.

2. Description of the Prior Art

The most pertinent patent is believed to be U.S. Pat. No. 5,146,942, issued Sep. 15, 1992, to Taylor for Low Pressure Fluid Emergency Shutdown Valve.

This patent discloses a low fluid pressure emergency shutdown valve formed by a valve body having a flow passageway interposed in a gas supply line downstream from a pressure regulator. A diaphragm responsive valve in the valve body is maintained open by a pin interposed between the valve stem and the downstream end portion of the valve body. Upstream fluid pressure, in response to a pressure regulator failing in the open position, above a predetermined limit, biases the diaphragm downstream to collapse the pin and move the valve to a flow passageway closed position.

This invention is distinctive over the above named patent providing coaxial sleeve means between a diaphragm and the fluid being monitored. Whereby the pressure above a predetermined limit communicates directly with the diaphragm means to unseat the valve and release the excess pressure.

BRIEF SUMMARY OF THE INVENTION

A tubular valve body having a flange adapted to be connected with a fluid containing vessel is provided with a valve seat in its opening. A valve having a centrally bored stem normally closes the valve seat. A circular array of posts having a length greater than the length of the valve stem are connected at one end, in equally spaced circumferential relation, with the valve flange and support a valve stem guide plate at their other ends. Coaxial inner and outer sleeves project axially through the valve stem guide plate and telescopically engage, at their depending end portions, the upper end portion of the valve stem. Circumferentially spaced springs extend between and are connected with confronting surfaces of the valve and the valve stem guide for biasing the valve toward the valve stem guide plate in response to fluid pressure unseating the valve. Upper and lower diaphragm chamber forming members are axially connected with the upper limit of the inner and outer sleeve members. Diaphragm assemblies in the respective diaphragm chamber are axially connected with a tubular rod supporting a collapsible pin assembly. Excess fluid pressure passing through the valve stem and rod biases the diaphragm assembly toward the valve stem guide plate which collapses the collapsible pin allowing fluid pressure in the vessel being monitored to bias the valve toward the diaphragm members assisted by the several springs.

The principle object of this invention is to provide a collapsible pin type relief valve for monitoring fluid pressure in a vessel having a working pressure less than atmospheric.

DETAILED DESCRIPTION OF THE INVENTION

Figure 2:
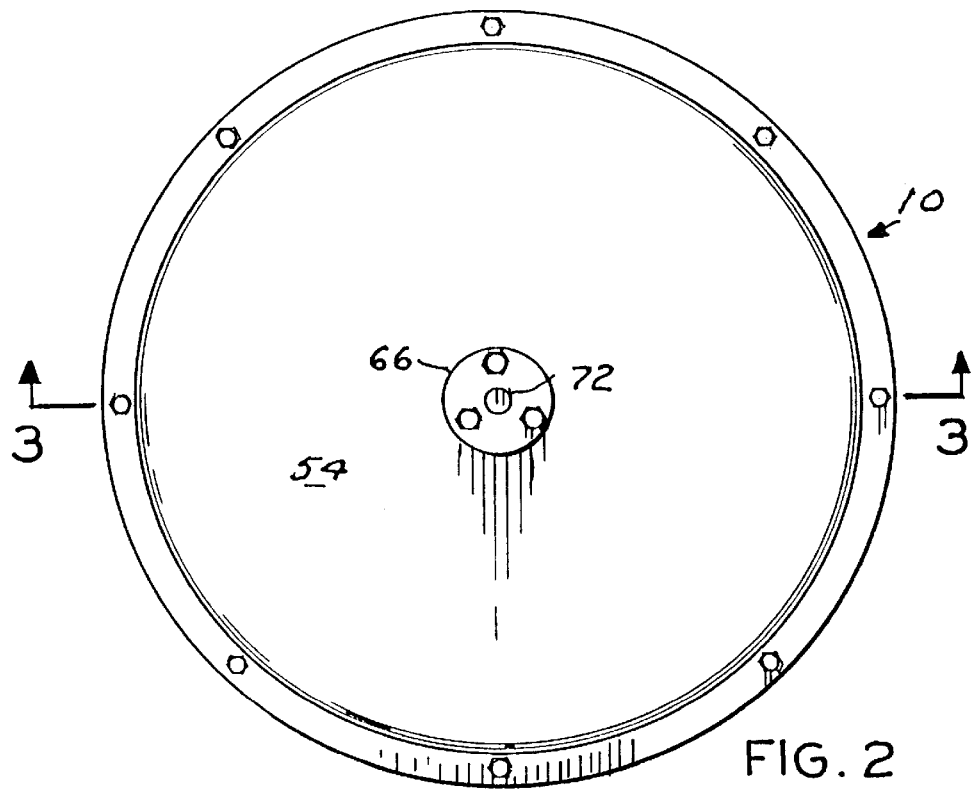
FIG. 2 is a top view.
Figure 1:
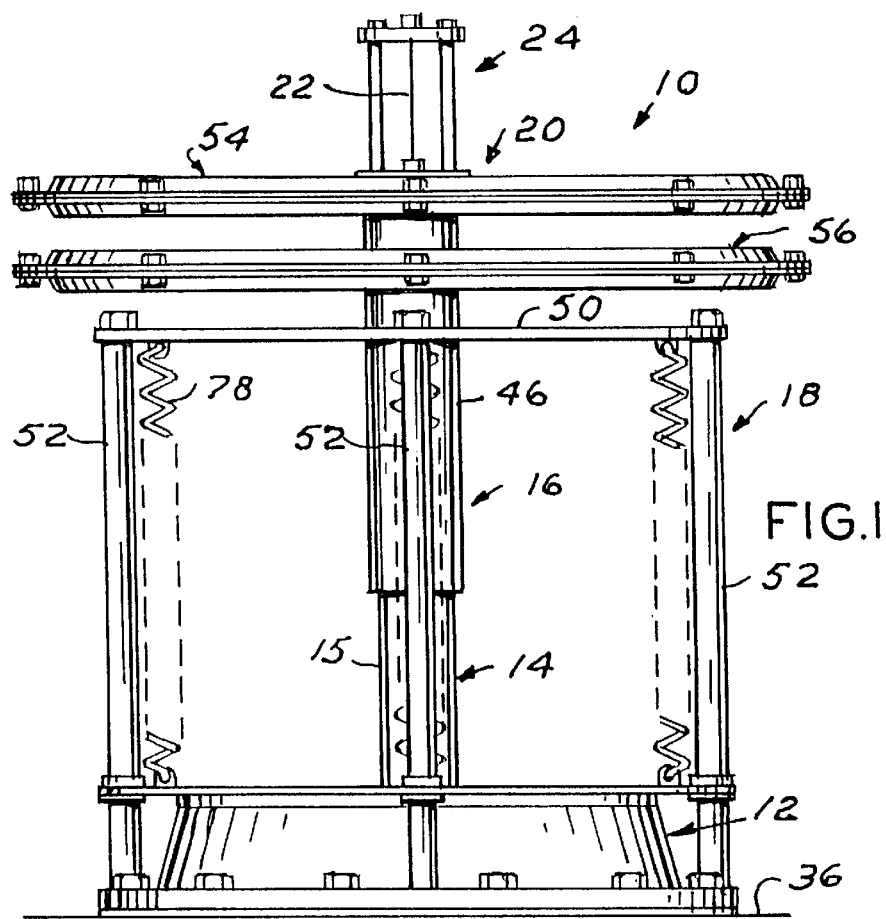
FIG. 1 is a side elevational view.

Like characters of reference designate like parts in those figures of the drawings in which they occur.

In the drawings:

Referring first to FIGS. 1–5 the reference numeral 10 indicates a valve having a valve base means 12 communicating with fluid in a vessel to be monitored and having a normally closed valve means 14 having a valve stem 15 slidably received by sleeve means 16 supported by valve cage means 18 in response to fluid pressure moving a diaphragm in a diaphragm means 20, axially supported by the sleeve means and collapsing a pin 22 in a pin cage means 24 normally axially supported by a diaphragm in the diaphragm housing.

Figure 4:
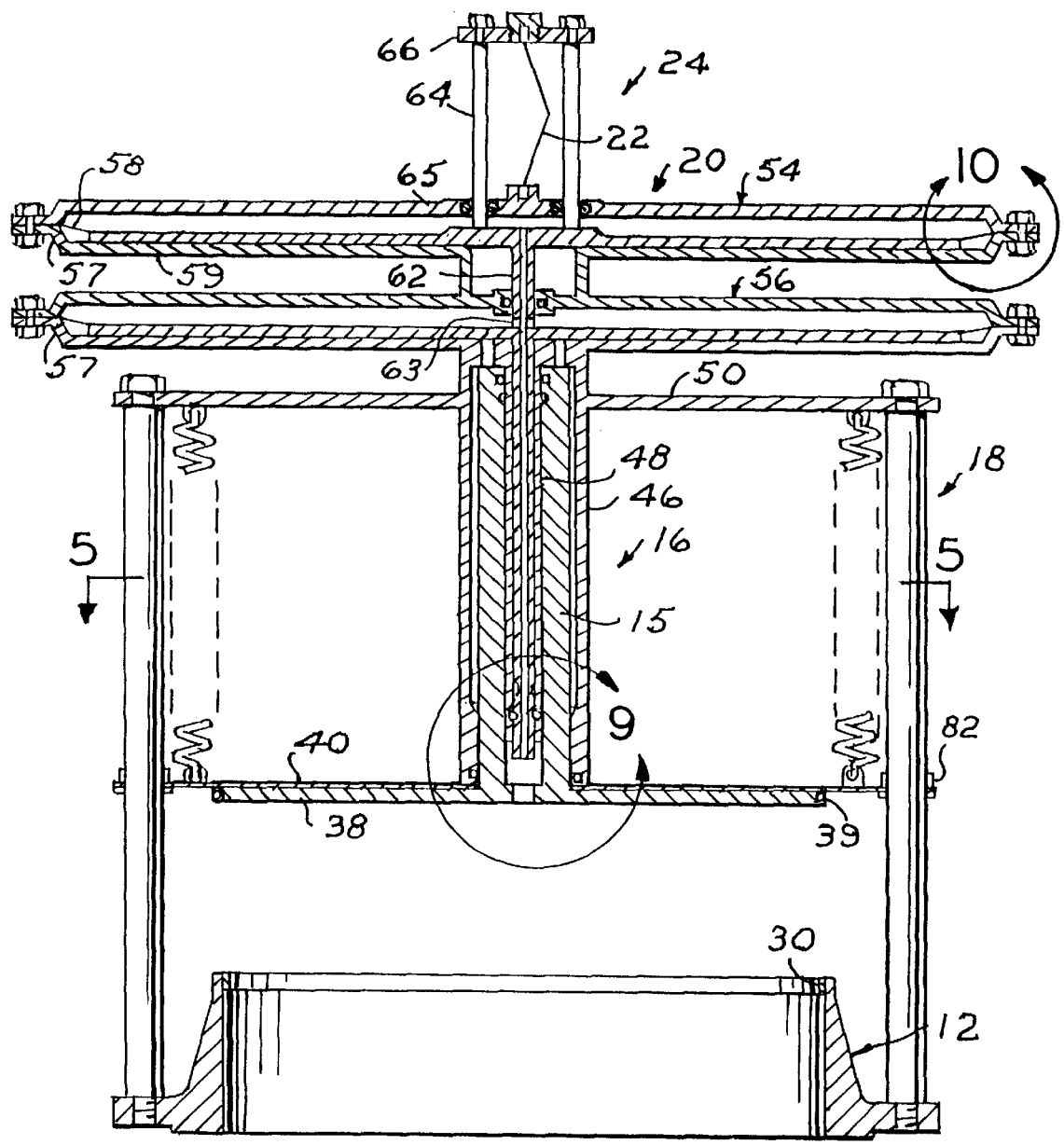
FIG. 4 is a vertical cross-sectional view similar to FIG. 3 illustrating the valve in open position.
Figure 9:
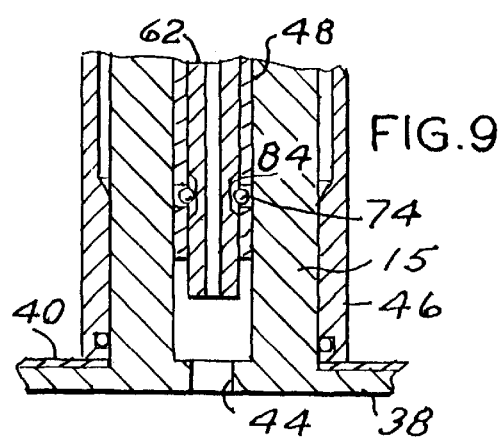
FIGS. 9 and 10 are similar fragmentary vertical cross-sectional views, to a larger scale, of the areas enclosed by the arrows 9 and 10 respectively of FIG. 4.
Figure 10:
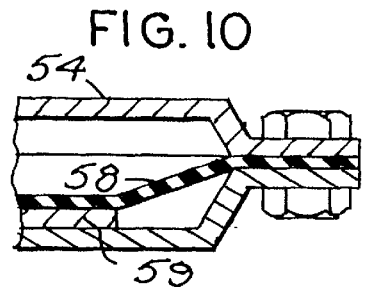
Figure 5:
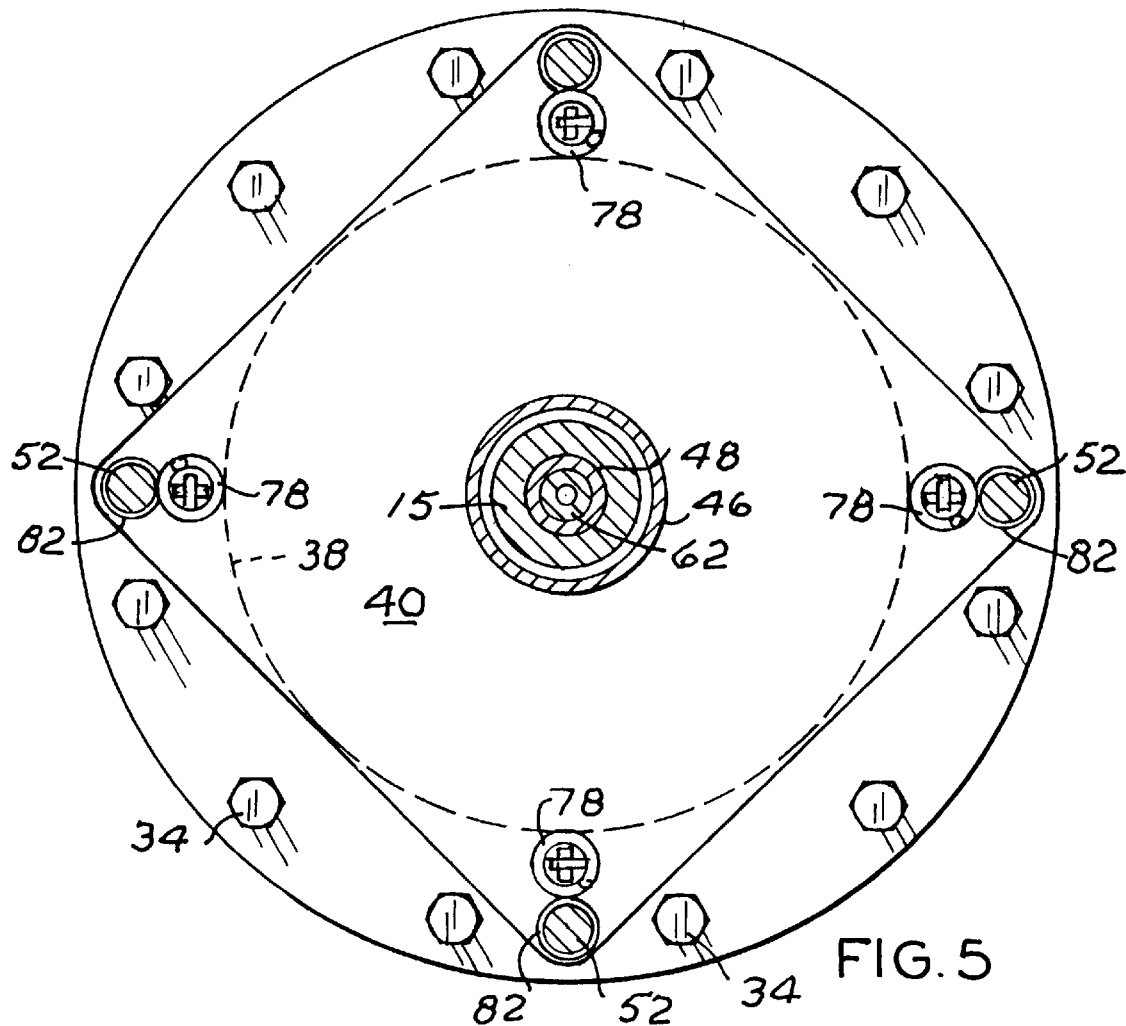
FIG. 5 is horizontal cross-sectional view taken substance along the line 5 - - - 5 of FIG. 4.
Figure 6:
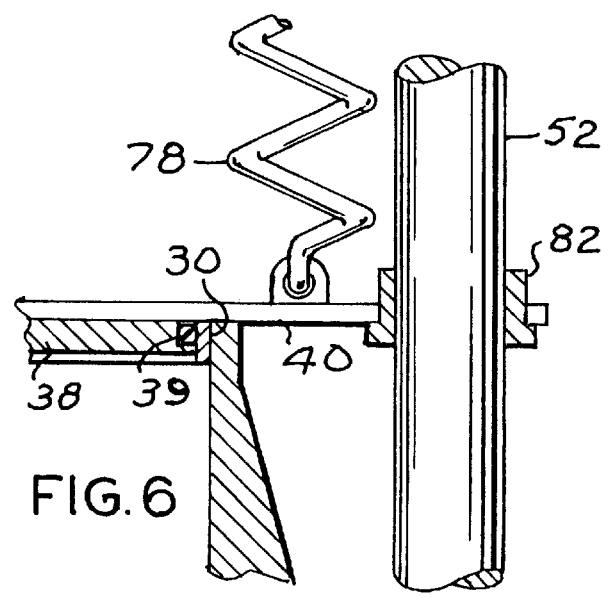

The valve base means 12 comprises a tubular body 26 having a relatively large opening 28 when compared with other relief valves, for example 61 cm (24 in.). The wall defining the base opening 28 is provided at one end portion with a valve seat 30 (FIG. 4). The valve body 26 is provided with an annular outstanding flange 32 for receiving a plurality of bolts 34, (FIG. 5) securing the valve body to a vessel 36 containing fluid, not shown, to be monitored.

The valve means 14 comprises a disc valve 38 (FIG. 4) surrounded by an O-ring 39 for sealing with the valve seat 30. The valve 38 is provided with an overlying plate forming outstanding flange portions 40 in the plane of its surface opposite the base body 26 for the purposes presently explained. The stem 15 is tubular and its bore 41 communicates with an opening 44 formed in the valve disc 38.

The sleeve means 16 comprises outer and inner coaxial sleeves, 46 and 48 respectively, joined at their upper end portions and axially projecting through a sleeve plate 50 in turn supported by a circular array of upstanding posts 52 mounted on the valve base flange 32 in circumferentially spaced relation. The outer sleeve 46 telescopically receives the periphery of the valve stem 15 and the inner sleeve 48 telescopically enters the valve stem bore 41 as presently explained.

The diaphragm means 20 comprises a pair of superposed diaphragm housings 54 and 56, of greater diameter than the base opening 28, and are respectively axially mounted on the upper end of an extension of the telescoping outer sleeve 46. The housings 54 and 56 are vented to the atmosphere, as at 57, and each contain a diaphragm 58 and 60, respectively, bonded to rigid diaphragm plates 59 and 61, respectively.

A rod-like tube 62 extends through and is axially connected with the respective diaphragm plates 59 and 61 and is coextensive with the inner sleeve 48. The tube 62 thus provides, through its bore and lateral apertures 63 (FIG. 4), fluid communication between the vessel 36 being monitored and the diaphragm housing space above the respective diaphragm 58 and for the purpose presently explained.

The plate 59 in the diaphragm housing 54 supports the pin cage means 24 comprising a plurality (3) of standards 64 connected with a pin plate 66 and slidably projecting through the top plate 65 of the diaphragm housing 54. The collapsible pin 22 axially extends between a boss 70 mounted on the diaphragm top plate 65 and a plug 72 threadedly connected with the pin plate 66.

Figure 3:
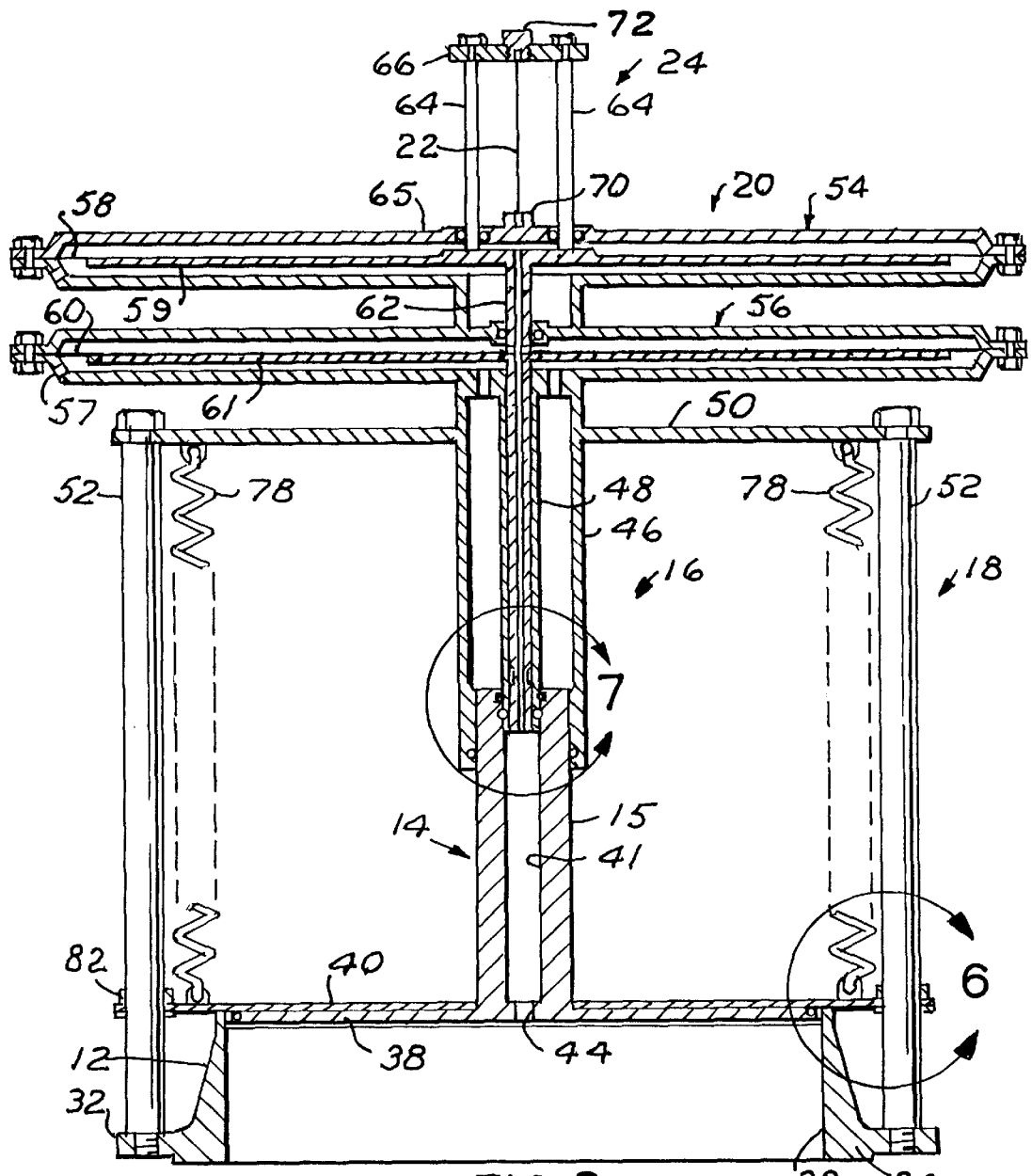
FIG. 3 is a vertical cross-sectional view taken substantially along the line 3 - - - 3 of FIG. 2.
Figure 7:
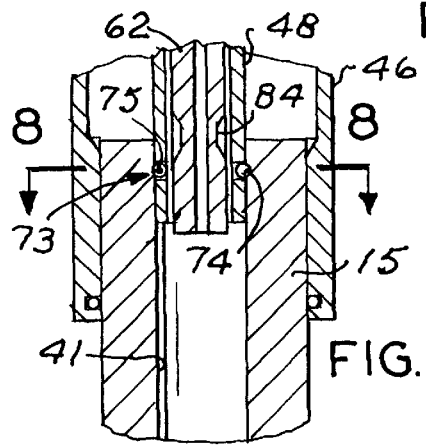
FIGS. 6 and 7 are fragmentary enlarged cross-sectional views, to a larger scale, of the areas enclosed by the arrows 6 and 7 respectively of FIG. 3.
Figure 8:
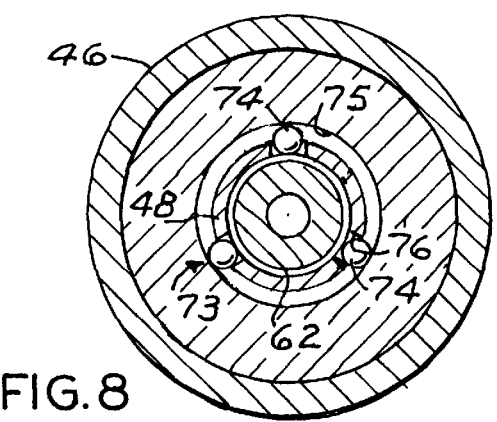
FIG. 8 is a horizontal sectional view, to a larger scale, taken substantially along the line 8 - - - 8 of FIG. 7.

Referring more particularly to FIGS. 6–9 the mass of the rod 62, diaphragm and plate assemblies 58–59 and 60–61, and pin cage means 24 is supported in the position illustrated by FIG. 3 by latch means 73 comprising a plurality (3) of balls 74 partially disposed in an annular groove 75 (FIG. 7) in the upper end portion of the wall forming the valve stem bore 41 which respectively enter slots 76 in the depending end portion of the inner sleeve 48. A plurality (4) of springs 78 extend between and are connected with the valve plate extensions 40 and the top plate 50. Sleeve guides 82 surrounding the posts 52 and secured to the valve extensions 40 guide the valve 38 and its stem 15 in its movement away from the valve seat 30.

OPERATION

Fluid pressure on that side of the diaphragms 58 and 60 opposite the valve 38 above a predetermined limit biases the diaphragm and plate assemblies and pin cage means 24 downward as viewed in the drawings, collapsing the pin 22, as illustrated by FIG. 4. This allows the balls 74 to enter an annular groove 84, formed in the depending end portion of the rod 62, permitting the springs 78 to unseat the valve 38 and move it to its open position (FIG. 4).

The valve 10 is reset by moving the valve 38 downwardly against the force of the springs 78 to engage its seat 30 in which the balls 74 are forced out of the annular groove 84 into the valve stem groove 75 by the inclined wall surface of the annular groove 84 in the rod 62. The pin cap plug 72 is unscrewed and a new pin installed in place of the collapsed pin, thus completing one cycle of operation.

Obviously the invention is susceptible to changes or alterations without defeating its practicability. Therefore, I do not wish to be confined to the preferred embodiments shown in the drawings and described herein.

I claim:

1. A low pressure relief valve, comprising:

a valve body adapted to be connected with a fluid containing member, said body having a fluid passageway and a valve seat in the passageway communicating with fluid in said member;

a valve having a tubular stem sealing with the seat and normally closing the passageway;

posts on said valve body supporting a valve guide plate in spaced relation with respect to said valve;

spring means interposed between said valve guide plate and said valve for biasing said valve toward a passageway open position;

coaxial sleeve means axially extending though and supported by said guide plate for telescopically receiving and entering said valve stem;

superposed diaphragm housing means axially supported by said sleeve means opposite the valve;

diaphragm means dividing each diaphragm housing to form upper and lower compartments on respective sides of the diaphragm means and including a tubular diaphragm stem extending from the uppermost diaphragm means into said valve stem for providing fluid communication between said fluid containing member and the respective said upper diaphragm compartment;

pin cage means including standards slidably projecting through the top surface of the uppermost diaphragm housing and secured to the uppermost diaphragm means opposite the valve and supporting a collapsible pin interposed between the pin cage means and the surface of the adjacent diaphragm housing;

latch means in the valve stem engaging the sleeve means for maintaining the valve seated;

whereby fluid pressure exceeding a predetermined value in the diaphragm housing opposite the valve moves the diaphragm means toward the valve simultaneously collapsing the collapsible pin and releasing the latch means allowing said spring means to unseat the valve and open the passageway.

2. A low pressure relief valve, comprising:

a valve body adapted to be connected with a fluid containing member, said body having a fluid passageway and a valve seat in the passageway communicating with fluid in said member; a valve having a tubular stem normally closing the passageway;

post means supporting a valve stem guide plate in spaced relation with respect to said valve;

resilient means interposed between said valve stem guide plate and said valve for biasing said valve toward a passage way open position;

sleeve means axially supported by said guide plate for telescopically receiving said valve stem; diaphragm housing means axially supported by said sleeve means opposite the valve;

diaphragm means dividing the diaphragm housing including a tubular diaphragm stem projecting into said valve stem for providing fluid communication between said member and the diaphragm housing opposite the valve;

pin cage means including standards slidably projecting through and secured to the diaphragm means opposite the valve and supporting a collapsible pin interposed between the pin cage means and the diaphragm housing, latch means in the valve stem engaging the sleeve means for maintaining the valve seated;

whereby fluid pressure exceeding a predetermined value in the diaphragm housing opposite the valve moves the diaphragm means toward the valve simultaneously collapsing the collapsible pin and releasing the latch means allowing said spring means to unseat the valve and open the passageway.

3. The relief valve according to claim 2 in which the sleeve means comprises:

coaxial inner and outer sleeves for respectively telescopically entering and surrounding the valve stem.

4. The relief valve according to claim 2 in which the bore of the valve stem is provided with a annual groove adjacent its end portion opposite the valve and the wall of the inner sleeve is provided with a plurality of circumferentially spaced slots adjacent its end portion opposite the diaphragm housings and said latch means comprises:

a like plurality of balls partially nested by the groove and slots.

* * * * *